United States Patent [19]

Masuda

[11] Patent Number: 5,607,897
[45] Date of Patent: Mar. 4, 1997

[54] POLYESTER FILM FOR SUBLIMATION-TYPE THERMOSENSITIVE TRANSFER RECORDING MEDIUM

[75] Inventor: Narihiro Masuda, Nagahama, Japan

[73] Assignee: Diafoil Hoechst Company, Limited, Tokyo, Japan

[21] Appl. No.: 538,705

[22] Filed: Oct. 3, 1995

[30] Foreign Application Priority Data

Oct. 5, 1994 [JP] Japan .................................. 6-241365

[51] Int. Cl.⁶ ............................. B41M 5/035; B41M 5/38
[52] U.S. Cl. ......................... 503/227; 428/195; 428/323; 428/409; 428/423.7; 428/480; 428/483; 428/910; 428/913; 428/914
[58] Field of Search .................................. 8/471; 428/195, 428/409, 323, 423.1, 423.7, 480, 483, 910, 913, 914; 503/227

[56] References Cited

U.S. PATENT DOCUMENTS 5,185,314   2/1993   Fujimura et al. .................... 503/227

OTHER PUBLICATIONS

Patent Abstracts of Japan, M section, vol. 18, No. 335, JP-A-06 079 844, Mar.-1994.
Patent Abstracts of Japan, C section,vol. 13, No. 427, JP-A-01 165 633, Jun.-1989.
Patent Abstracts of Japan, M section, vol. 12, No. 466, JP-A-634 191 679, Aug.-1988.

*Primary Examiner*—B. Hamilton Hess
*Attorney, Agent, or Firm*—Foley & Lardner

[57] ABSTRACT

The disclosure describes a polyester film for sublimation-type thermosensitive transfer, comprising a polyester film having the degree of planar orientation of 0.145 to 0.169, and a coating layer formed by applying a water solution or a water dispersion composed of at least one water-soluble or water-dispersible resin selected from the group consisting of urethane-based resins, polyester-based resins and acrylic-based resins, on at least one side of the film before oriented crystallization of said film is completed, and subjecting the coated polyester film to drying treatment, stretching treatment and heat-setting treatment.

20 Claims, No Drawings

POLYESTER FILM FOR SUBLIMATION-TYPE THERMOSENSITIVE TRANSFER RECORDING MEDIUM

BACKGROUND OF THE INVENTION

The present invention relates to a polyester film as a base film for sublimation-type thermosensitive transfer recording medium.

Sublimation-type thermosensitive transfer is typified by excellent gradation quality of the printed image in comparison with melt-type thermosensitive transfer, and is preferably employed for full color printing where distinct expression of intermediate colors is particularly required. Recently, through improvements of the recording media containing sublimable dyes or improvements of hardware devices such as printers, it has become possible to obtain images with high fineness almost equal to photograph.

Another serious request in full color printing using sublimation-type thermosensitive transfer is enlargement of the size of the printed image. Particularly, the printed images having a large area such as more than A-4 size are demanded. It is also required that the printing be performed in a time not much longer than needed for conventional A-6 to B-5 size printing. This calls for elevation of the printing speed and entails an increase of the printing energy.

However, in the conventional thermosensitive transfer recording media, the heat resistance of the base film has been unsatisfactory, and an increase of the printing energy would give rise to the problem of wrinkling of the ink ribbon under high heat, causing a printing defect (white line) at this portion to badly reduce the quality of the printed image.

In the course of the present inventors' studies for overcoming the above problem, it has been found that by using a polyester film having the specific properties as base film of the recording medium, more specifically by using, as base film of a sublimation-type thermosensitive transfer recording medium, a laminated polyester film obtained by applying a coating solution comprising at least one water-soluble or water-dispersible resin selected from the group consisting of urethane-based resins, polyester-based resins and acrylic-based resins on at least one side of a polyester film as a support film before the oriented crystallization of the polyester film is completed, and subjecting the obtained film to drying treatment, stretching treatment and heat-setting treatment. The present invention has been attained on the basis of the said finding.

SUMMARY OF THE INVENTION

It is an object of the present invention to provide a polyester film for sublimation-type thermosensitive transfer, which serves for preventing wrinkling of the ink ribbon so as to cause no printing defect that impairs the quality of the printed image and which is also improved in adhesiveness to the sublimable ink even if the color printing with a large area such as exceeding A-4 size is performed.

To accomplish the aim, in a first aspect of the present invention, there is provided a laminated polyester film for sublimation-type thermosensitive transfer, comprising a polyester film having the degree of planar orientation of 0.145 to 0.169, and a coating film formed on at least one side thereof, by applying a coating solution comprising at least one water-soluble or water-dispersible resin selected from the group consisting of urethane-based resins, polyester-based resins and acrylic-based resins before the oriented crystallization of the polyester film is completed, and subjecting the obtained film to drying treatment, stretching treatment and heat-setting treatment.

In a second aspect of the present invention, there is provided a sublimation-type thermosensitive transfer recording medium comprising the laminated polyester film defined in the first aspect, an ink layer disposed on the surface of the coating layer, and a heat resistant layer disposed on the side of the polyester film opposite from the ink layer side.

DETAILED DESCRIPTION OF THE INVENTION

The polyester film used as a support film in the present invention is preferably one in which not less than 80 mol %, preferably not less than 90 mol % of its structural units is constituted by ethylene terephthalate. The polyester film used in the present invention may contain less than 20 mol %, preferably not more than 10 mol %, for instance as a copolymeric component, of a diol such as diethylene glycol, propylene glycol, neopentyl glycol, polyethylene glycol, 1,4-cyclohexanedimethanol, 1,4-butanediol or the like, a dicarboxylic acid such as isophthalic acid, 2,6-naphthalenedicarboxylic acid, 1,4-cyclohexanedicarboxylic acid, sulfonylisophthalic acid or the like, or an oxycarboxylic acid such as oxybenzoic acid.

The polyester film used in the present invention preferably contains the added particles for forming protuberances on the film surface for facilitating working of the polyester film to an ink ribbon and for securing desired running performance of the produced ink ribbon. The particles usable for this purpose include particles of silica, kaolin, talc, clay, calcium carbonate, barium sulfate, calcium terephthalate, titanium oxide and carbon black, and crosslinked organic particles. The average diameter of these particles is 0.1 to 10 μm, preferably 0.5 to 5.0 μm, and the content of the particles in the polyester film is 0.05 to 5.0 wt %, preferably 0.1 to 1.0 wt %.

The polyester film used in the present invention is biaxially oriented and then heat-set so that the degree of planar orientation (ΔP) of the produced film falls in a range of 0.145 to 0.169, preferably 0.150 to 0.165, more preferably 0.150 to 0.159. When the degree of planar orientation exceeds 0.169, there takes place wrinkling of the ink ribbon in high-energy printing operation. The mechanism of causing wrinkling is not definitely known but may be accounted for by the following facts. In the printing operation, the ink ribbon is heated to a very high temperature only at its portion immediately below the thermal head or the area in close neighborhood thereof. On the other hand, as is well known, the polyester film has the nature of restoring the original state of molecular orientation, which has been drawn on stretching of the film, when the film is heated again (this phenomenon is called "relaxation of orientation"). However, since no such relaxation of orientation takes place at the nonheated portion, there is produced a strain (minute sag of the film) between the relaxed part and the non-relaxed part of the film. In this case, if the degree of planar orientation (i.e. the degree of orientation toward the plane of polyester molecules) is large, the relaxation of orientation becomes large, causing a corresponding increase of the amount of strain generated. Since the wrinkling in the printing operation occurs when the thermal head passes over the said minute sag of the film, it is considered that the higher the degree of planar orientation of the polyester film, the greater is the probability that the ink ribbon be wrinkled during printing. On the other hand, when the degree of planar orientation is less than 0.145, the mechanical strength of the polyester film serving as a support film of the ink ribbon tends to lower.

It is essential that the polyester film of the present invention has on at least one side thereof a coating layer comprising at least one water-soluble or water-dispersible resin selected from urethane-based resins, polyester-based resins and acrylic-based resins. This coating layer is disposed for increasing adhesion between the ink layer composed of a sublimable dye and a resin binder, and the polyester film used as the support film. In case where the said coating layer is provided on one side-alone of the polyester film, usually the ink layer is disposed on the said coating layer. In case where the said coating layer is disposed on both sides of the polyester film, one of the coating layers may be used as an adhesive layer for the ink layer while the other coating layer may be used for elevating adhesiveness to the heat resistant layer described later. In this case, the heat resistant layer is provided after oriented crystallization of the polyester film has been completed.

As the water-soluble or water-dispersible resins usable for forming the said coating layer, urethane-based resins, polyester-based resins and acrylic-based resins such as mentioned below, may be cited.

The urethane-based resins usable for forming the said coating layer is composed of (polyvalent) polyols and polyvalent isocyanates, and optionally, chain-lengthening agents and crosslinking agents.

Examples of the (polyvalent) polyols usable as the resin component are polyethers such as polyoxyethylene glycol, polyoxypropylene glycol and polyoxytetramethylene glycol, polyesters such as polyethylene adipate and polycaprolactone, acrylic-based polyols, castor oil and the like.

Examples of the polyvalent isocyanates usable as the resin component are tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate.

Examples of chain-lengthening agents and crosslinking agents usable as the resin component include ethylene glycol, propylene glycol, diethylene glycol, trimethylolpropane, hydrazinc, ethylenediamine, diethylenetriamine, 4,4'-diaminodiphenylmethane, 4,4'-diaminodicyclohexylmethane, and water.

As for polyester-based resins usable for forming the said coating layer, polyvalent carboxylic acids and polyvalent hydroxy compounds such as mentioned below can be used as resin components. Polyvalent carboxylic acids usable as resin component include terephthalic acid, isophthalic acid, orthophthalic acid, phthalic acid, 4,4'-diphenylcarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt, and ester-forming derivatives thereof. Examples of polyvalent hydroxy compounds usable as polyester-based resin component include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate. At least one compound is selected from each of the said polyvalent carboxylic acids and polyvalent hydroxy compounds, and the selected compounds are subjected to ordinary polycondensation reaction to synthesize a desired polyester-based resin. Composite polymers having acrylic graft polyesters such as disclosed in Japanese Patent Application Laid-Open (KOKAI) 1-165633, or other polyesters such as polyester polyurethane obtained by chain-lengthening a polyester polyol with an isocyanate, are also included in the polyester-based resins used in the present invention.

The acrylic-based resins usable for forming the coating layer is preferably one whose main component is an alkyl acrylate or an alkyl methacrylate, and a water-soluble or water-dispersible resin comprising 30 to 90 mol % of the said component and 70 to 10 mol % of a vinyl monomer which is copolymerizable therewith and has a functional group, can be cited. The vinyl monomers copolymerizable with the said alkyl acrylate or alkyl methacrylate and having a functional group, which are usable in the present invention, are those having as functional group a carboxyl group or a salt thereof, an acid anhydride group, a sulfonic group or a salt thereof, an amide group or hydroxymethylated amide group, an amino group (which may be substituted) or hydroxymethylated amino group or a salt thereof, a hydroxyl group, an epoxy group or the like. A carboxyl group or a salt thereof, an acid anhydride group and an epoxy group are preferred. Two or more of these groups may be contained in the resin.

Examples of alkyl groups in the said alkyl acrylate and alkyl methacrylate include methyl group, n-propyl group, isopropyl group, n-butyl group, isobutyl group, 2-ethylhexyl group, lauryl group, stearyl group and cyclohexyl group.

As the vinyl monomer copolymerizable with the said alkyl acrylate or alkyl methacrylate and having a functional group, the following compounds having a functional group such as reactive functional group, self-crosslinking functional group or hydrophilic group can be cited.

Examples of the compounds having a carboxyl group or a salt thereof, or an acid anhydride group are acrylic acid, methacrylic acid, itaconic acid, maleic acid, metal salts (such as sodium salt or the like) of these carboxylic acids with sodium, ammonium salts of these carboxylic acids and maleic anhydride. Examples of the compounds having a sulfonic group or a salt thereof are vinylsulfonic acid, styrenesulfonic acid, metal salts (such as sodium salt or the like) of these sulfonic acids, and ammonium salts of these carboxylic acids.

Examples of the compounds having an amide group or hydroxymethylated amide group include acrylamide, methacrylamide, N-methylmethacrylamide, hydroxymethylated acrylamide, hydroxymethylated methacrylamid, ureidovinyl ether, β-ureidoisobutylvinyl ether, ureidoethyl acrylate and the like.

Examples of the compounds having an amino group, or hydroxymethylated amino group or a salt thereof include diethylaminoethylvinyl ether, 2-aminoethylvinyl ether, 3-aminopropylvinyl ether, 2-aminobutylvinyl ether, dimethylaminoethyl methacrylate, dimethylaminoethylvinyl ether, and these compounds in which the amino group has been hydroxymethylated or quadrivalented with a halogenated alkyl, dimethylsulfuric acid, sultone or the like.

Examples of the compounds having a hydroxyl group include β-hydroxyethyl acrylate, β-hydroxyethyl methacrylate, β-hydroxypropyl acrylate, β-hydroxypropyl methacrylate, β-hydroxyvinyl ether, 5-hydroxypentylvinyl ether, 6-hydroxyhexylvinyl ether, polyethylene glycol monoacrylate, polyethylene glycol monomethacrylate, polypropylene glycol monoacrylate and polypropylene glycol monomethacrylate.

Examples of the compounds having an epoxy group include glycidyl acrylate and glycidyl methacrylate.

It is also possible to jointly use other compounds such as acrylonitrile, styrenes, butylvinyl ether, maleic mono- or di-alkyl esters, fumaric mono- or di-alkyl esters, ithaconic mono- or di-alkyl esters, methyl vinyl ketone, vinyl chloride, vinylidene chloride, vinyl acetate, vinylpyridine, vinylpyrrolidone, vinyltrimethoxysilane and the like.

The coating layer used in the present invention is formed by applying a coating solution containing a water-soluble or water-dispersible resin on a base film, preferably using water as solvent for the reason of hygienic safety, but the coating solution may contain an organic solvent as an auxiliary of the water-soluble or water-dispersible resin within limits not affecting the aspect of the present invention. Even in this case, the content of the organic solvent in the coating solution should not exceed 20 wt %.

In case a water-dispersible resin is used for forming the coating layer, it is possible to perform forced dispersion using a surfactant. As a surfactant, there can be used self-dispersing type materials having a hydrophilic nonionic component such as polyethers and a cationic group such as quadrivalent ammonium salt, more preferably those having an anionic group having a salt of sulfonic acid, carboxylic acid, phosphoric acid or the like.

The coating layer of the polyester film according to the present invention may contain as crosslinking agent isocyanate-based compounds, epoxy-based compounds, oxazoline-based compounds, aziridine-based compounds, melamine-based compounds, silane coupling agents, titanium coupling agents, zirco-aluminate coupling agents or the like for improving anti-blocking properties, water resistance, solvent resistance and mechanical strength of the film. If the resin material of the intermediate adhesive layer has a crosslinking reaction active point, a reaction initiator such as peroxides and amines or a sensitizer such as photosensitive resins may be contained. Also, for improving anti-blocking properties and slip property, fine inorganic particles such as particles of silica, silica sol, alumina, alumina sol, zirconium sol, kaolin, talc, calcium carbonate, calcium phosphate, titanium oxide, barium sulfate, carbon black, molybdenum sulfide, antimony oxide sol and the like, or fine organic particles such as particles of polystyrene, polyethylenes, polyamides, polyesters, polyacrylic ester, epoxy-based resins, silicone-based resins, fluorine-based resins and the like, may be contained in the coating layer to provide a film surface roughness in the range mentioned below. The coating layer may further contain as desired a defoaming agent, an applicability improver, a thickening agent, an antistatic agent, an organic lubricant, an antioxidant, an ultraviolet absorber, a foaming agent, a dye, a pigment and the like.

In the polyester film for sublimation-type thermosensitive transfer according to the present invention, it is essential that the coating layer be formed before oriented crystallization of the polyester film is completed, and be subjected to drying treatment, stretching treatment and heat-setting treatment. The coating layer is required to be thin enough to allow transfer of heat from the thermal head and have such an uniformity of thickness so as to give no influence on adhesiveness. For this reason, in the present invention, the coating layer is produced by a method in which coating is carried out during the polyester film-forming process and the coating layer can be thinned uniformly at the same time as the polyester film as the support film is stretched. This method is also advantageous for providing high adhesion between the coating layer and the polyester film as the support film. Generally, in case of forming the coating layer by using a coating solution of the same composition, the peeling along the interface between the coating layer and the polyester film is more liable to take place when the coating layer is formed by applying the coating solution after the oriented crystallization of the polyester film and then subjecting to drying treatment than when the coating layer is formed by applying the coating solution before the oriented crystallization of the polyester film and then subjecting to drying treatment, stretching treatment and heat-setting treatment. This phenomenon is unaccounted for but is considered attributable to the following facts. The polyester molecular chain undergoes a re-arrangement accompanied with crystallization when the polyester film is stretched and heat-set, but in this case, if a coating layer is formed thereon, the high-affinity portions of the coating layer molecules and the polyester molecules are strongly bound or entangled with each other, resulting in strengthened adhesion. On the other hand, in a film in which the oriented crystallization has been completed, there no longer exists any degree of freedom for a rearrangement accompanied with crystallization of polyester molecular chain and the interaction between the said polyester molecules and coating layer molecules is small, resulting in reduced adhesion.

Since the degree of planar orientation of the polyester film of the present invention is relatively low (0.145 to 0.169), the adhesion between the coating layer and the polyester film is further improved. More specifically, comparing a film having a planar orientation degree exceeding 0.169 and a film having a planar orientation degree in a range of 0.145 to 0.169, it is found that the latter film has stronger adhesion to the coating layer even when the coating layer is formed before completion of the oriented crystallization by using a same coating solution.

In the present invention, it is required to limit the degree of planar orientation of the polyester film to a range of 0.145 to 0.169. For attaining this, it is recommended to employ a method in which the polyester film to be biaxially stretched is first stretched in the machine direction (longitudinal direction) and then stretched in the width direction (transverse direction). Further, by selecting the stretching temperature and stretching ratio so that the birefringence of the polyester film will fall in a range of 0.035 to 0.90, preferably 0.050 to 0.080, at the point when the stretching in the machine direction has been completed, it is possible to attain the specified degree of planar orientation and to obtain a film with good uniformity of thickness in the longitudinal direction. The synergistic effect is obtained by applying the said coating solution to form a coating layer and further stretching the film in the transverse direction, followed by heat-setting.

The said stretching is preferably carried out at 60° to 150° C. for a stretching ratio of at least 4 times, preferably 6 to 20 times in terms of surface area. The stretched film is heat-treated at 150° to 250° C., preferably followed by 0.2 to 20% relaxation in both longitudinal and transverse directions at the highest temperature zone of the heat-treatment and/or the cooling zone at the outlet of the heat-treating station. Preferably, the polyester film as the support film is first stretched 2 to 6 times at 60° to 150° C. by roll stretching; then a coating solution is applied on this uniaxially stretched film;

and after appropriate drying or without drying, the uniaxially stretched polyester film is further stretched 2 to 6 times at 80° to 150° C. in the direction orthogonal to the initial stretching direction and then heat-treated at 150° to 250° C. for 1 to 600 seconds. It is required to select the stretching ratio, stretching temperature, heat-setting temperature and heat-treatment time so that the degree of planer orientation (ΔP) of the polyester film will fall in a range of 0.145 to 0.169, preferably 0.150 to 0.165, more preferably 0.150 to 0.159. It is also preferred to conduct the above treatments so that the produced polyester film will have an average refractive index ($n_{av.}$) of 1.600 to 1.607, preferably 1.601 to 1.606, and a birefringence (Δn) of 0.005 to 0.050, preferably 0.015 to 0.045.

As a method for applying the said coating solution on a polyester film, there can be cited, for example, a method in which coating is carried out in the film forming process by using a suitable coating device such as reverse roll coater, gravure coater, rod coater, air doctor coater, etc., such as published in Y. Harasaki: Coating Systems, Maki Shoten, 1979.

The coating layer thickness is preferably in a range of 0.01 to 2 μm, more preferably 0.02 to 1 μm, after drying and stretching. It is preferable to minimize the coating layer thickness for transfer of heat, but a thickness of less than 0.01 μm is undesirable because of unsatisfactory adhesiveness to the sublimable ink.

The center line average roughness (Ra) of the surface of the coating layer formed in the manner described above is preferably in a range of 0.005 to 0.5 μm, more preferably 0.02 to 0.3 μm, even more preferably 0.05 to 0.1 μm, with the influence of the particles added to the polyester film. When the Ra is less than 0.005 μm, the film is unsatisfactory in slip property and poor in workability. When the Ra exceeds 0.5 μm, the effect of improving slip property of the film is saturated.

The polyester film for sublimation-type thermosensitive transfer according to the present invention has an ink layer composed of a sublimable dye dispersed in a resin binder, the said ink layer being provided on the coating layer.

The sublimable dye used in the present invention is preferably one which sublimes rapidly in a relatively narrow temperature range close to transfer temperature. The dyes applicable to thermal transfer are those whose molecular weight falls in a range of 230 to 370 and which not only have the sublimation characteristics suited for dyeing but are also of a size convenient for dispersion in the inside of the object to be dyed. Structurally, the sublimable dye has no ionic group such as sulfonic group, carboxyl group, etc., but has polar groups such as hydroxyl group, amino group, nitro group, sulfonic group, etc., to an appropriate degree.

The resin binders usable in the present invention are those which allow easy sublimation of the dye molecules in a desired way and can also facilitate uniform dispersion of the dye. Examples of such resin binders include cellulose-based resins, acrylic-based resins, polyvinyl alcohol and polyamides.

In the polyester film of the present invention, usually a heat resistant layer is provided on the side opposite from the ink layer. This heat resistant layer is provided for the purpose of preventing sticking caused by heat when the film is brought into contact with the thermal head. Known materials can be used for forming the said heat resistant layer. For example, materials composed of waxes, higher fatty acids or lubricants such as silicone compounds and fluorine compounds as main component, or materials composed of inorganic particles, crosslinked organic particles, fluorine-based resin particles or the like serving as lubricant can be used.

Known methods can be employed for providing this heat resistant layer on the polyester film of the present invention. For example, as in the case of the said coating layer, there can be employed a method in which the film-forming material is applied as a water solution or a water dispersion and then dried, stretched and heat-set in the polyester film forming process, or a method in which an aqueous or organic solvent-type material is applied on a polyester film which has been completed with oriented crystallization, and then dried.

When an ink ribbon is produced by using as support the polyester film for sublimation-type thermosensitive transfer according to the present invention and put to use for color printing with a large area such as more than A-4 size, there scarcely takes place wrinkling of the ink ribbon, minimizing the possibility of causing formation of printing defect that degrades the printed image. Also, because of good adhesiveness with the sublimable ink, the said film of the present invention is suited as support of the sublimation-type ink ribbon and has high commercial value.

EXAMPLES

The present invention is described in more detail herein below with reference to the examples. It should be understood, however, that the present invention is not restricted to these examples but can be embodied otherwise without departing from the scope and spirit of the invention.

The evaluation methods used in the Examples are as described below. In the following Examples and Comparative Examples, all "parts" are "part by weight" unless otherwise noted.

(1) Degree of planar orientation (ΔP), birefringence (Δn) and average refractive index ($n_{av.}$)

Using an Abbe's refractometer (manufactured by Atago Optical Co., Ltd), the maximum value (nγ) of in-plane refractive index of the film, refractive index (nβ) in the direction orthogonal thereto and refractive index (nα) in the thickness direction of the film were measured, and the degree of planar orientation, birefringence and average refractive index were calculated from the following equations. Measurements of refractive induces were made at 23° C. using sodium D line.

Degree of planar orientation (ΔP)=[(nγ+nβ)/2]-nα

Birefringence (Δn)=(nα+nβ+nγ)/3

Average refractive index ($n_{av.}$)=nγ-nβ (2) Degree of wrinkle

A 2 μm-thick sublimable ink layer composed of 10 parts of KAYASET B (trade name, produced by Nippon Kayaku Co., Ltd), 15 parts of cellulose acetate propionate, 2 parts of silica particles and one part of methylolmelamine was formed on the surface of a coating layer disposed on a polyester film (on an optional side in case where no coating layer is provided), while a 0.1 μm-thick heat resistant layer composed of 86 parts of a polyimide obtained from a mixture of benzophenone-3,3',4,4'-tetracarboxylic acid anhydride and tolylene diisocyanate (80 mol %), and 4,4'-diphenylmethane diisocyanate (20 mol %), 7 parts of calcium carbonate particles having an average diameter of 0.07 μm and 7 parts of a fluorine-based silicone oil FL-100 (trade name, produced by Shin-Etsu Chemical Industry Co., Ltd) was formed on the opposite side of the film to obtain a sublimation-type thermosensitive transfer recording medium. This was cut to an appropriate width and rolled up to prepare an ink ribbon.

This ink ribbon was set in a sublimation-type thermal transfer color printer Phaser 044JS (manufactured by Sony Tectronics Co., Ltd.), and solid printing was carried out on the middle of B-4 sized thermosensitive image receiving paper for a length of 40 cm with a width of 25 cm. After printing, the ink ribbon and the printed portion of the image receiving paper were visually observed to determine the presence or absence of wrinkle and printing defect, and their degree was expressed by the following ranking:

Rank AA: Absolutely no wrinkle and printing defect.

Rank A: Wrinkles and printing defects were insignificantly few.

Rank B: Small wrinkles and printing defects were generated at the side of the printed portion, and they were conspicuous.

Rank C: Large wrinkles and printing defects were generated in the area from the side to the center of the printed portion of the image receiving paper.

(3) Adhesiveness between sublimable ink layer and polyester film

A Nichiban Cellophane Tape (trade name) or a 3M Scotch Mending Tape 810 (trade name) was pasted to the ink layer of the sublimation-type thermosensitive transfer recording medium used in (2). The tape was quickly peeled, and adhesiveness was examined and expressed by the following ranking according to the degree of peeling of the ink layer.

o: Peeling area of the ink layer was less than 10%. Excellent adhesiveness.

Δ: Peeling area of the ink layer was 10–20%, which is in the allowable range.

X: Peeling area of the ink layer was 20–50%. Insufficient adhesiveness.

XX: Peeling area of the ink layer exceeded 50%. Bad adhesiveness.

(4) Center-line average surface roughness (Ra)

Measured according to the method of JIS B0601-1976 using a surface roughness tester SE-3F (manufactured by Kosaka Kenkyusho Ltd.), under the following conditions: probe diameter=2 μm; cut-off value=0.08 mm; reference length=2.5 mm. Measurement was made at 12 spots. The maximum and the minimum values of measurement were cut out, and the average of the remaining 10 measurements was calculated to obtain the average surface roughness ,Ra, (μm).

EXAMPLE 1

Polyethylene terephthalate having an intrinsic viscosity of 0.66 and containing 0.3% of silica particles with an average particle diameter of 1.0 μm was melt-extruded at 290° C. according to a conventional method to obtain an amorphous sheet. This sheet was roll-stretched 2.60 times in the machine direction at 83° C. and then further roll-stretched 1.20 times in the same direction at 92° C. The resulting film had a birefringence of 0.064. Then a coating solution of the following composition was applied on one side of the obtained film.

Coating solution:
Water dispersion composed of 40 parts of polyester modified with sodium sulfonylisophthalate (RZ-105, trade name, produced by Gooh Chemical Industry Co., Ltd.), and 60 parts of self-crosslinking hydrosol-type acrylic resin of methyl methacrylate/isobutyl methacrylate/acrylic acid/methacrylic acid/glycidyl methacrylate copolymer ammonium salt structure (SEK-725, trade name, produced by Nippon Junyaku Co., Ltd.) ("parts" herein and hereinafter are by solid weight unless otherwise noted).

Then the film was stretched 4.0 times in the transverse direction at 110° C. and heat-treated at 230° C. to obtain a oriented polyester film with a coating layer thickness of 0.07 μm and a film thickness of 5 μm.

The evaluation results of this polyester film are shown in Table 1. Since the degree of planar orientation was in the preferred range determined in the present invention, there took place no wrinkling in printing operation and adhesion of the film to the ink layer was quite satisfactory.

EXAMPLES 2 and 3

In Example 1, the sheet was stretched 2.6 times in the first stage and 1.18 times in the second stage (Example 2) in the machine direction or 2.6 times in the first stage and 1.14 times in the second stage (Example 3) in the machine direction. The obtained films had a birefringence of 0.060 (Example 2) and 0.052 (Example 3), respectively. Thereafter, each film was subjected to the same coating, stretching and heat-setting treatments as in Example 1 to obtain a biaxially oriented polyester film with a coating layer thickness of 0.07 μm and a film thickness of 5 μm. The evaluation results of the obtained polyester films are shown in Table 1. Since the degree of planar orientation was in the preferred range, there scarcely took place wrinkling in the printing operation and adhesion of the film to the ink layer was excellent.

EXAMPLE 4

The procedure of Example 1 was carried out till stretching step in the machine direction. A coating solution composed of a water dispersion of 90 parts of a water-dispersible polyurethane having a carboxylic acid ammonium salt (Hydran AP40, trade name, produced by Dai-Nippon Ink Chemical Industry Co., Ltd) and 10 parts of triethylene glycol diglycidyl ether was applied on one side of the obtained film.

Then the film was stretched 2.5 times in the transverse direction at 100° C., further stretched 1.6 times in the same direction at 110° C., and then heat-treated at 230° C. to obtain a biaxially oriented polyester film with a coating layer thickness of 0.07 μm and a film thickness of 5 μm.

The evaluation results of this polyester film are shown in Table 1. Since the degree of planar orientation was in the preferred range, there took place no wrinkling in the printing operation, and adhesion of the film to the ink layer was quite satisfactory.

COMPARATIVE EXAMPLE 1

In Example 1, stretching in the machine direction was conducted at 83° C. to stretch 2.9 times in the first stage and at 76° C. to stretch 1.35 times in the second stage. The obtained film had a birefringence of 0.115. Thereafter, the film was subjected to the same stretching, coating and heat-setting treatments as conducted in Example 1 to obtain a biaxially oriented polyester film with a coating layer thickness of 0.07 μm and a film thickness of 5 μm.

The evaluation results of this polyester film are shown in Table 1. Since the degree of planar orientation was outside of the preferred range, there took place wrinkling in the printing operation, greatly reducing the quality c the printed image.

COMPARATIVE EXAMPLE 2

In Example 1, the sheet was stretched 2.6 times initially and 1.3 times secondly in the machine direction. The obtained film had a birefringence of 0.075. Thereafter, the film was subjected to the same stretching, coating and heat-setting treatments as conducted in Example 1 to obtain a biaxially oriented polyester film with a coating layer thickness of 0.07 μm and a film thickness of 5 μm.

The evaluation results of this polyester film are shown in Table 1. Since the degree of planar orientation was outside of the preferred range, there took place wrinkling at the edge in the printing operation, reducing the quality of the printed image.

COMPARATIVE EXAMPLE 3

The procedure of Example 1 was followed except that no coating was conducted to obtain a biaxially oriented polyester film with a thickness of 5 μm.

The evaluation results of this polyester film are shown in Table 1. Since the degree of planar orientation was in the preferred range, no wrinkling occurred in the printing operation, but because of poor adhesion to the ink layer, the ink layer partly exfoliated and stuck to the image receiving paper.

COMPARATIVE EXAMPLE 4

The procedure of Example 1 was followed except that no coating was conducted to obtain a biaxially oriented polyester film with a thickness of 5 μm. A coating solution same as used in Example 1 was applied on this film and dried to provide a 0.07 μm-thick coating layer.

The evaluation results of this polyester film are shown in Table 1. Since the degree of planar orientation was in the preferred range, no wrinkling occurred in the printing operation, but because of poor adhesion to the ink layer, the ink layer partly exfoliated and stuck to the image receiving paper.

TABLE 1 (I)

|  | Example 1 | Example 2 | Example 3 | Example 4 |
|---|---|---|---|---|
| Orientation Degree of planar orientation (ΔP) | 0.165 | 0.160 | 0.158 | 0.166 |
| Double refractive index (Δn) | 0.021 | 0.015 | 0.029 | 0.027 |
| Average refractive index ($n_{av}$) | 1.605 | 1.605 | 1.604 | 1.605 |
| Adhesiveness to ink layer | ◯ | ◯ | ◯ | Δ |
| Degree of wrinkle | Rank A | Rank A | Rank AA | Rank A |

TABLE 1 (II)

|  | Comp. Example 1 | Comp. Example 2 | Comp. Example 3 | Comp. Example 4 |
|---|---|---|---|---|
| Orientation Degree of planar orientation (ΔP) | 0.177 | 0.172 | 0.165 | 0.165 |
| Double refractive index (Δn) | 0.002 | 0.015 | 0.021 | 0.021 |
| Average refractive index ($n_{av}$) | 1.605 | 1.605 | 1.605 | 1.605 |
| Adhesiveness to ink layer | Δ | ◯ | ×× | × |
| Degree of wrinkle | Rank C | Rank B | Rank A | Rank A |

What is claimed is:

1. A sublimation thermosensitive transfer recording medium comprising
    a polyester film having a degree of planar orientation of 0.145 to 0.169, and
    a coating layer formed on at least one side of the polyester film by applying a water solution or a water despersion comprising at least one water-soluble or water-dispersible resin selected from the group consisting of urethane-based resins, polyester-based resins, and acrylic-based resins, before oriented crystallization of said film is completed, and subjecting the obtained polyester film to drying treatment, stretching treatment, and heat-setting treatment,
    a sublimable ink layer disposed on the surface of the coating layer, and
    a heat resistant layer disposed on the side of the polyester film opposite from the ink layer side.

2. A recording medium according to claim 1, wherein the degree of planar orientation of the polyester film is 0.150 to 0.165.

3. A recording medium according to claim 1, wherein the average refractive index of the polyester film is 1.600 to 1.607.

4. A recording medium according to claim 1, wherein the birefringence of the polyester film is 0.005 to 0.050.

5. A recording medium according to claim 1, wherein the thickness of the coating layer is 0.01 to 2 μm.

6. A recording medium according to claim 1, wherein prior to application of the coating, the polyester film is stretched in the machine direction so that the film has a birefringence of 0.035 to 0.90 after said stretching.

7. A recording medium according to claim 1, wherein the coating layer is formed from the urethane-based resins, wherein the urethane-based resins are composed of a polyol and a polyvalent isocyanate.

8. A recording medium according to claim 1, wherein the coating layer is formed from the polyester-based resins, wherein the polyester-based resins are composed of a polyvalent carboxylic acid compound and a polyvalent hydroxy compound.

9. A recording medium according to claim 1, wherein the coating layer is formed from the acrylic-based resins, wherein the acrylic-based resins are composed of 30 to 90 mol % of an alkyl acrylate or alkyl methacrylate, and 70 to 10 mol % of a vinyl monomer copolymerizable with said alkyl acrylate or alkyl methacrylate and having a functional group.

10. A recording medium according to claim 1, wherein the center-line average surface roughness of the coating layer surface is 0.005 to 0.5 μm.

11. A recording medium according to claim 1, wherein the coating layer contains at least one crosslinking agent selected from the group consisting of isocyanate-based compounds, epoxy-based compounds, oxazoline-based compounds, aziridine-based compounds, melamine-based compounds, silane coupling agents, titanium coupling agents and zirco-aluminate coupling agents.

12. A recording medium as claimed in claim 1, wherein the polyester film comprises a polyester having not less than 80 mol % of ethylene terephthalate units.

13. A recording medium as claimed in claim 1, wherein the polyester film comprises 0.05 to 5.0 wt % of particles having an average diameter of 0.1 to 10 μm.

14. A recording medium as claimed in claim 1, further comprising an additional coating layer between the polyester film and the heat resistant layer.

15. A recording medium as claimed in claim 1, wherein the sublimable ink layer comprises a sublimable dye dispersed in a resin binder.

16. A recording medium as claimed in claim 1, wherein the stretching treatment comprises stretching in the transverse direction.

17. A recording medium as claimed in claim 1, wherein before forming of the coating layer, the polyester film is stretched in the machine direction.

18. A recording medium as claimed in claim 1, wherein the stretching treatment comprises stretching in the transverse direction 2 to 6 times at a temperature of 80° to 150° C.

19. A recording medium as claimed in claim 1, wherein before forming of the coating layer, the polyester film is stretched in the machine direction 2 to 6 times at a temperature of 60° to 150° C.

20. A recording medium as claimed in claim 1, wherein the heat-setting treatment comprises heat-treating at 60° to 150° C.

* * * * *